United States Patent
Yamaguchi et al.

(10) Patent No.: US 7,284,794 B2
(45) Date of Patent: Oct. 23, 2007

(54) VEHICLE SEAT

(75) Inventors: Hiroyoshi Yamaguchi, Yokohama (JP);
Makoto Hasegawa, Yokohama (JP);
Takeshi Itoh, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 11/436,740

(22) Filed: May 18, 2006

(65) Prior Publication Data
US 2006/0202525 A1 Sep. 14, 2006

Related U.S. Application Data (63) Continuation of application No. PCT/JP05/15382, filed on Aug. 18, 2005.

(30) Foreign Application Priority Data

Aug. 19, 2004 (JP) .............................. 2004-239496

(51) Int. Cl.
*B60N 2/42* (2006.01)
(52) U.S. Cl. .............................. 297/216.12; 297/216.13
(58) Field of Classification Search .......... 297/216.12, 297/216.13, 216.14, 408
See application file for complete search history.

(56) References Cited

U.S. PATENT DOCUMENTS

| | | | | |
|---|---|---|---|---|
| 5,927,804 A | * | 7/1999 | Cuevas ................. | 297/216.12 |
| 6,024,406 A | * | 2/2000 | Charras et al. ........ | 297/216.14 |
| 6,354,659 B1 | * | 3/2002 | Andersson et al. .... | 297/216.14 |
| 6,523,892 B1 | | 2/2003 | Kage et al. ............ | 297/216.13 |
| 6,789,846 B2 | * | 9/2004 | Humer et al. .......... | 297/216.12 |
| 7,097,242 B2 | * | 8/2006 | Farquhar et al. ....... | 297/216.12 |
| 7,134,717 B2 | * | 11/2006 | Thunnissen et al. ... | 297/216.12 |
| 2002/0195846 A1 | * | 12/2002 | Masuda et al. ........ | 297/216.12 |

FOREIGN PATENT DOCUMENTS

| | | |
|---|---|---|
| EP | 1053907 | 5/2000 |
| JP | 10-138812 | 5/1998 |
| JP | 2000-210155 | 8/2000 |
| JP | 2001-26232 | 1/2001 |
| JP | 2001-163099 | 6/2001 |

OTHER PUBLICATIONS

PCT International Search Report dated Nov. 2, 20085 in respect to PCT Application No. PCT/JP2005/015382.
PCT Written Opinion of the International Searching Authority dated Nov. 15, 2005 in respect to PCT Application No. PCT/JP2005/015382.

* cited by examiner

*Primary Examiner*—Peter R. Brown
(74) *Attorney, Agent, or Firm*—Ohlandt, Greeley, Ruggiero & Perle, L.L.P.

(57) ABSTRACT

A seat back comprises a support bracket in which a stay of a head rest is inserted, a guide bracket for supporting a rear surface of a vertically intermediate portion of the support bracket on the seat back frame, a head rest tilt mechanism, and a pressure receiving member which moves rearward when pushed by the body of an occupant. The head rest tilt mechanism includes slotted brackets each having a guide hole and slide members which individually movably engage the respective guide holes of the slotted brackets along the longitudinal direction thereof. The head rest tilt mechanism drives the sub-frame so that the head rest body tilts forward while moving upward as the slide members are moved upward along the guide holes when the pressure receiving member is moved rearward.

4 Claims, 8 Drawing Sheets

VEHICLE SEAT

CROSS-REFERENCE TO RELATED APPLICATIONS

This is a Continuation Application of PCT Application No. PCT/JP2005/015382, filed Aug. 18, 2005, which was published under PCT Article 21(2) in English.

This application is based upon and claims the benefit of priority from prior Japanese Patent Application No. 2004-239496, filed Aug. 19, 2004, the entire contents of which are incorporated herein by reference.

BACKGROUND OF THE INVENTION

1. Field of the Invention

This invention relates to a vehicle seat having a head restraint apparatus.

2. Description of the Related Art

Proposed is a movable head restraint apparatus in which a head rest can be moved forward to restrain the head of an occupant in case of a rear-end collision of a vehicle or the like. A vehicle seat structure described in Jpn. Pat. Appln. KOKAI Publication No. 2001-163099 (patent document 1), for example, comprises guide pins that are arranged under stays of a head rest and slots in which the guide pins are fitted individually. The slots extend in the vertical direction. This prior art example is provided with passive means that is actuated by an inertial load of the occupant's body at the time of collision. The passive means causes guide pins to move upward along the slots. In this arrangement, the head rest tilts forward as it moves upward.

In a seat back described in Jpn. Pat. Appln. KOKAI Publication No. 2000-210155 (patent document 2), moreover, a pressure receiving member is provided at the back of a pad. In case of collision, an armature pipe is pushed up by the pressure receiving member. In this prior art example, a vertically intermediate portion of the armature pipe moves forward and upward at the time of collision. Thus, the head rest tilts forward as it moves upward.

In the structures described in the patent documents 1 and 2, that part of the head rest which corresponds to the under-neck region of the occupant's body moves forward the moment the occupant's body is pressed against the seat back at the time of collision. Accordingly, the under-neck region tends to be restrained before the occupant's head is restrained by the head rest. Thus, the head rest is hindered from moving in a desired direction (or forward and upward). Besides, the under-neck region is inevitably restrained earlier than the head, so that the effect of the head restraint cannot be fully enjoyed.

In the conventional movable head restraint apparatus described above, moreover, the stays of the head rest are easily returned back by a load (horizontal rearward load) from the occupant's head that acts on the head rest after the head rest abuts against the head. Thus, the head restraint is inadequate.

BRIEF SUMMARY OF THE INVENTION

Accordingly, the object of the present invention is to provide a vehicle seat provided with a head rest that can restrain an occupant's head more effectively in case of collision.

A vehicle seat according to the present invention comprises a seat back having a seat back frame, a head rest having a head rest body provided on the top of the seat back and a stay extending under the head rest body, a support bracket in which the stay of the head rest is inserted, a guide bracket which is provided on the seat back frame and supports a rear surface of a vertically intermediate portion of the support bracket on the seat back frame so that the support bracket is vertically movable, a pressure receiving member which is provided in the seat back and moves rearward when pushed by the body of an occupant, a sub-frame having a cross portion to which a lower part of the support bracket is fixed and a pair of arm portions which extend individually downward from the opposite ends of the cross portion, and a head rest tilt mechanism which actuates the head rest body when the pressure receiving member is moved rearward.

The head rest tilt mechanism includes slotted brackets, each of which has a vertically extending guide hole and is provided on the seat back frame, and slide members, which individually movably engage the respective guide holes of the slotted brackets and are provided individually on the arm portions of the sub-frame, and is configured to drive the sub-frame so that the head rest body tilts forward while moving upward as the slide members are moved along the guide holes when the pressure receiving member is moved rearward.

According to this arrangement, the head rest can be moved in a desired direction at the time of collision, so that the operating efficiency is high, and an under-neck region of the occupant can be prevented from being restrained before the occupant's head is restrained. Even if the occupant's head touches the actuated head rest and applies a rearward load to it, moreover, the head rest can be checked from being pushed back. Thus, the occupant's head can be restrained effectively.

Each of the guide holes is a straight slot formed corresponding to a path of action of the head rest body. Alternatively, it is an arcuate slot formed corresponding to a path of action of the head rest body. By suitably changing the shape of the guide holes (e.g., slots), an optimum path of action of the head rest body can be realized depending on various conditions (e.g., shape and size of the seat back frame, position of the head rest, etc.).

In a preferred form of the invention, each of the slotted bracket has a guide surface with which its corresponding slide member is brought into contact as the slide member moves along the guide hole. The guide surface should preferably be a surface against which the slide member is pressed to lock the head rest body when a rearward load produced by restraint of the head of the occupant acts on the head rest body. By the use of this guide surface, the head rest body can be checked from being returned by the rearward load that acts on it when the occupant's head touches the head rest body after or during the action of the head rest.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A first embodiment of the present invention will now be described with reference to FIGS. 1 to 5.

Figure 1:
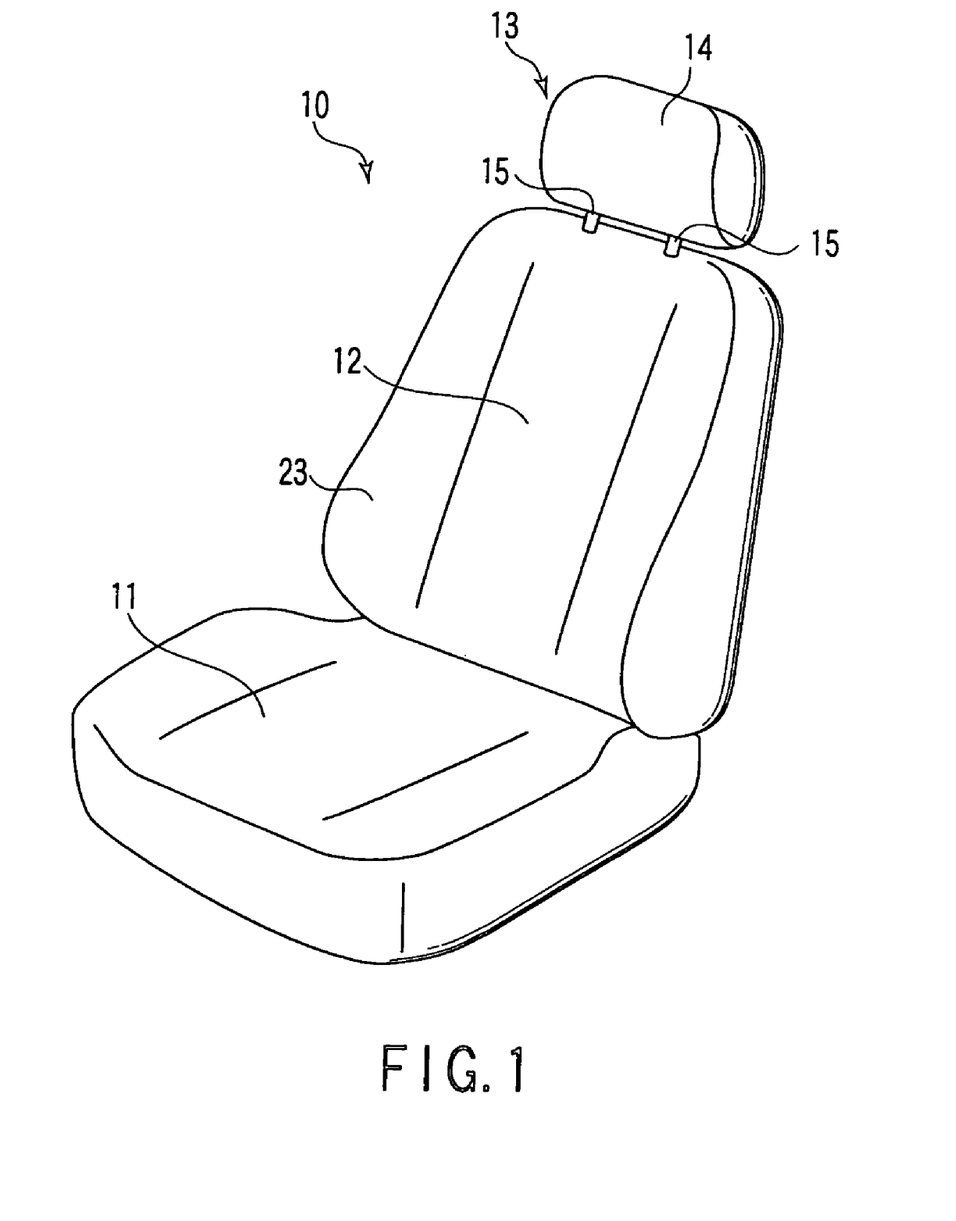
FIG. 1 is a perspective view of a vehicle seat according to a first embodiment of the invention.

FIG. 1 shows a vehicle seat 10 having a head restraint apparatus. The seat 10 comprises a seat cushion 11, a seat back 12, and a head rest 13. The head rest 13 has a head rest body 14 provided on the top of the seat back 12 and left- and right-hand stays 15 that extend under the head rest body 14.

Figure 2:
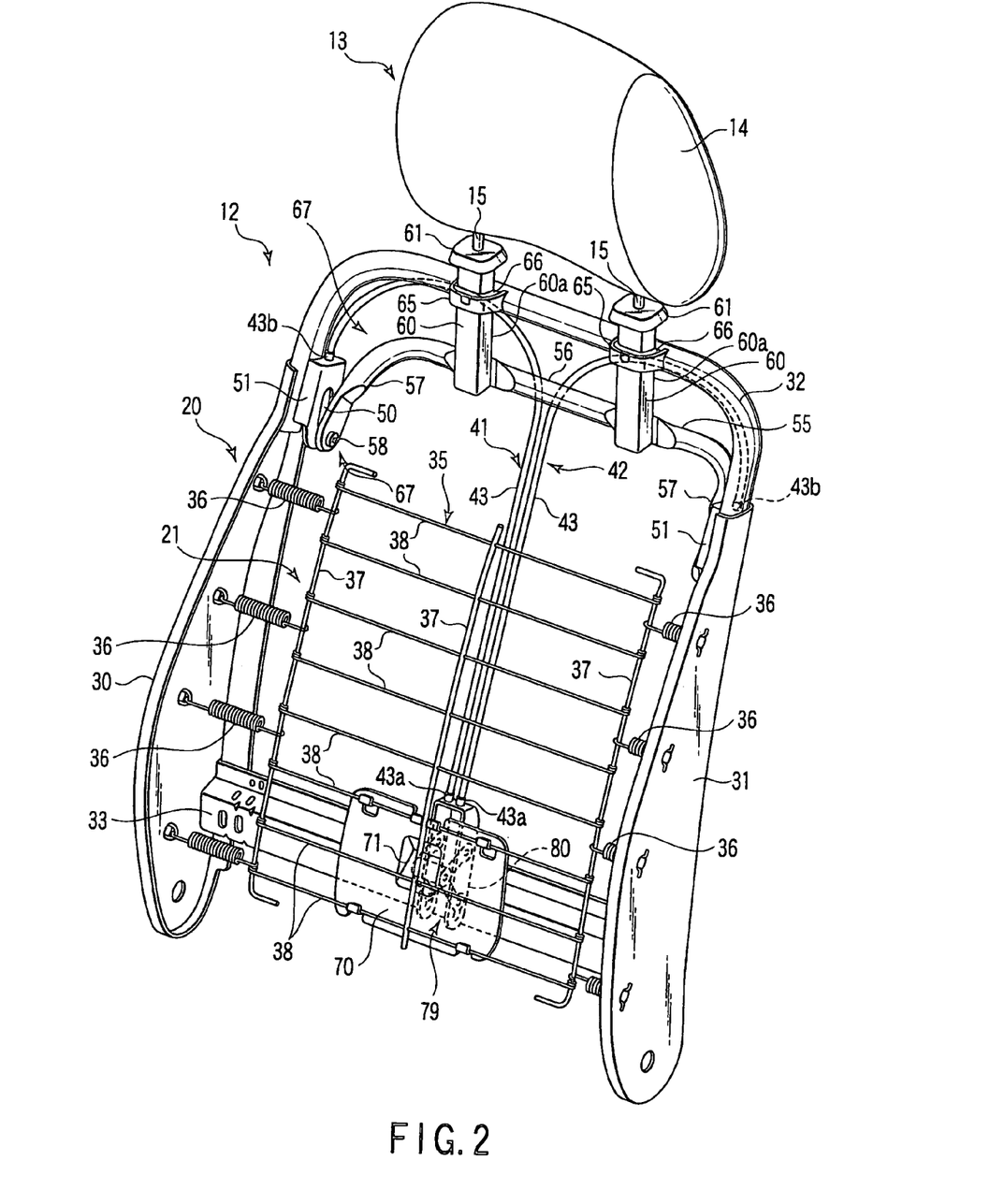
FIG. 2 is a perspective view showing the interior of a seat back of the vehicle seat shown in FIG. 1.
Figure 3:
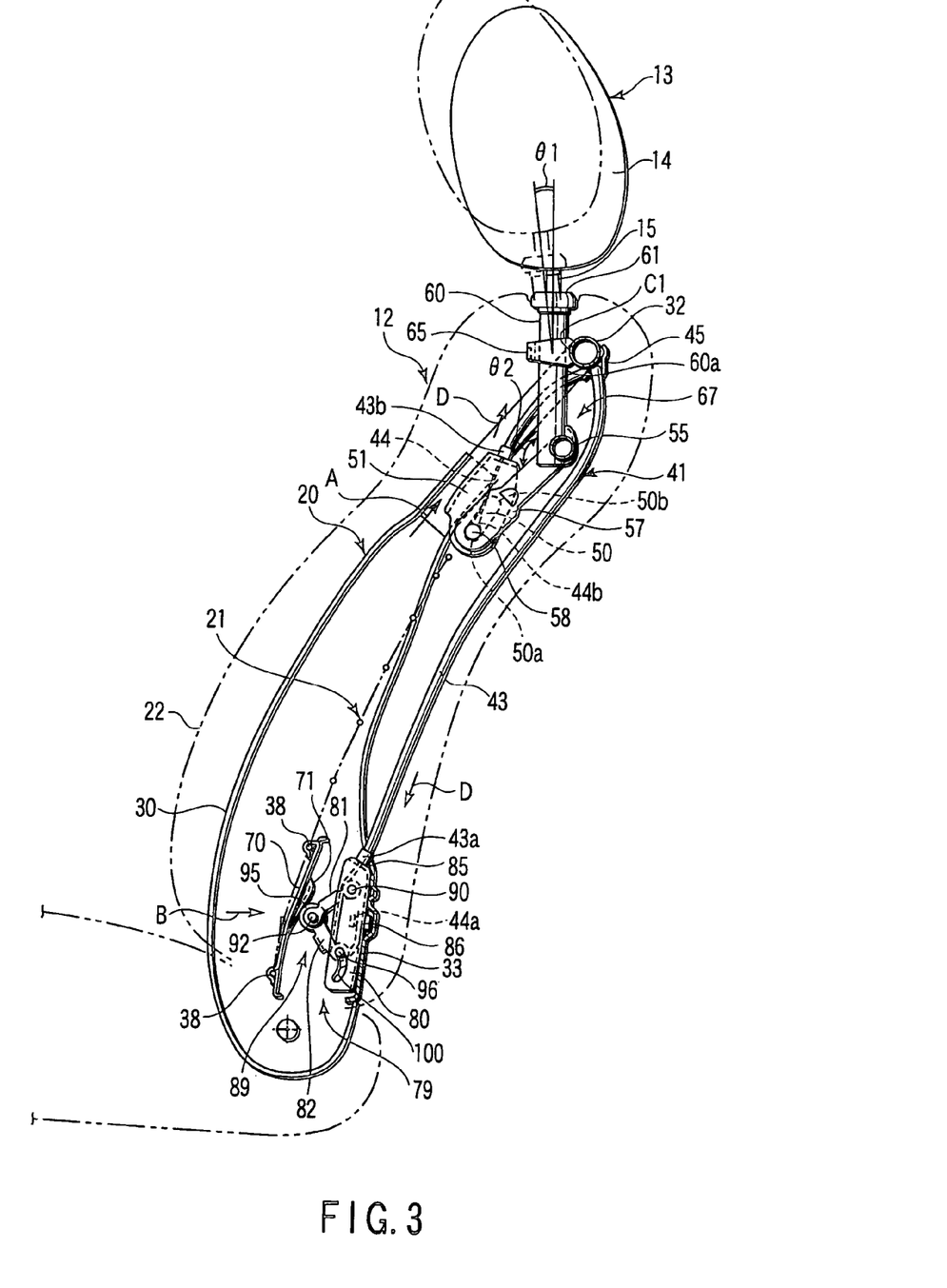
FIG. 3 is a side view showing the interior of the seat back of the seat shown in FIG. 1.

FIGS. 2 and 3 show the interior of the seat back 12. The seat back 12 has a seat back frame 20, a spring assembly 21, a pad member 22 (indicated by two-dot chain line in FIG. 3), a cover member 23 (FIG. 1), etc. The pad member 22 is located so as to cover the spring assembly 21. The cover member 23 covers the outer surface of the pad member 22.

The seat back frame 20 is composed of left- and right-hand side frame members 30 and 31, an upper frame member 32, a lower frame member 33, etc. The upper frame member 32 is situated on the upper part of the seat back frame 20. The lower frame member 33 is situated on the lower part of the seat back frame 20. The lower frame member 33 is formed in a given shape by press-molding a metal plate. The upper frame member 32 is formed of, e.g., a pipe, and its opposite ends are welded individually to the respective top portions of the side frame members 30 and 31. The opposite ends of the lower frame member 33 are welded individually to the respective bottom portions of the side frame members 30 and 31.

An example of the spring assembly 21 is composed of a flat spring 35, a plurality of tension springs 36, etc. The flat spring 35 is composed of longitudinal wires 37 extending in the vertical direction and cross wires 38 extending in the horizontal direction. The opposite side portions of the flat spring 35 are supported individually on the side frame members 30 and 31 by the tension springs 36.

As shown in FIG. 2, cables 41 and 42 of two systems are arranged in the seat back 12. FIG. 3 shows the one cable 41 as a representative. Each of the cables 41 and 42 has an outer tube 43 and a wire 44 inserted in the outer tube 43. A longitudinally intermediate portion of each of the cables 41 and 42 is supported on, for example, the upper frame member 32 by a retainer 45 (FIG. 3).

The wire 44 is an example of a line member. As shown in FIGS. 2 and 3, the outer tube 43 has one end 43a and the other end 43b. The wire 44 also has one end 44a and the other end 44b.

Figure 4:
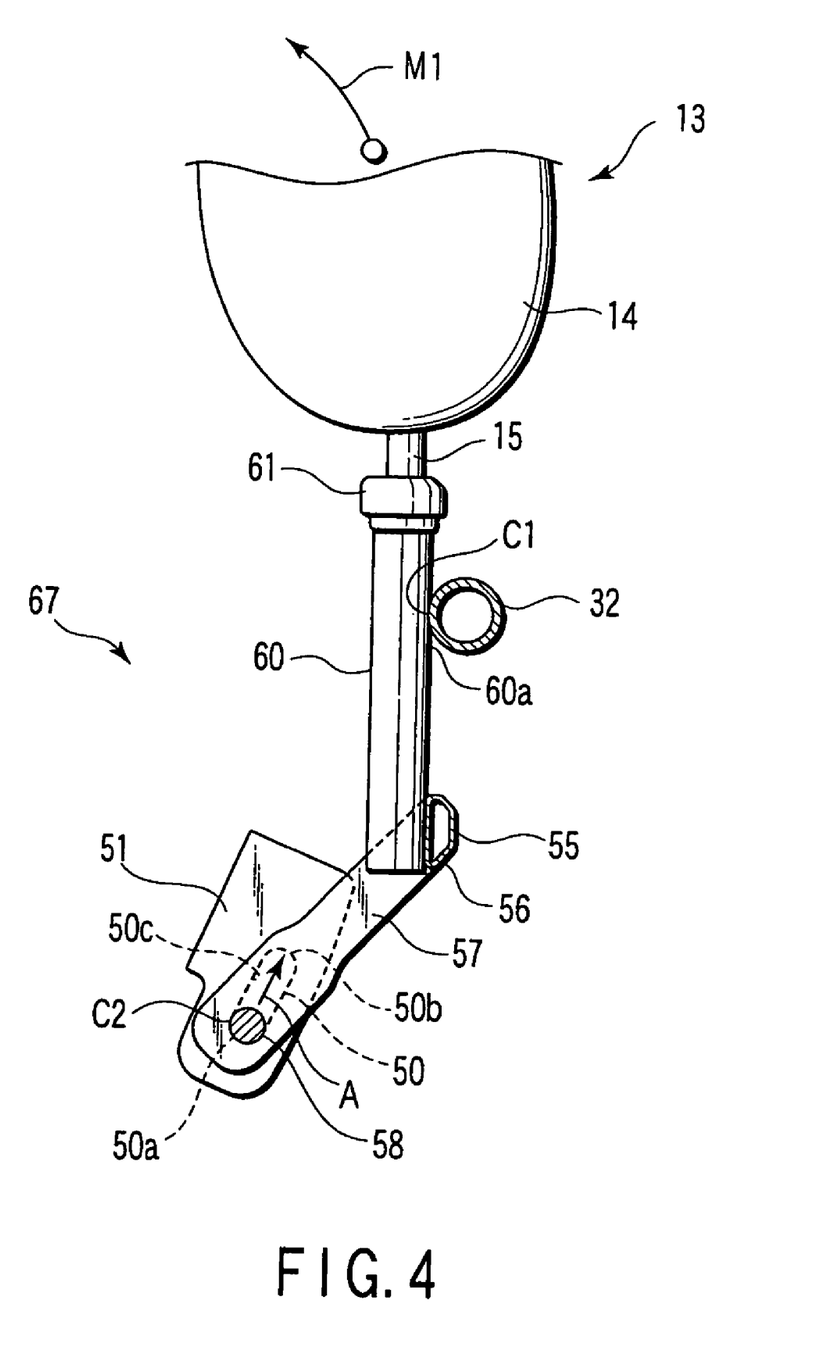
FIG. 4 is a side view of a head rest tilt mechanism of the seat shown in FIG. 1.

As shown in FIGS. 2 to 4, a slotted bracket 51 having a guide hole 50 is provided on each end portion of the upper frame member 32 of the seat back frame 20. The guide hole 50 has an inclined shape such that its one end 50a is situated below its other end 50b, and extends substantially straight in a vertical oblique direction. A sub-frame 55 is provided between the paired slotted brackets 51.

The sub-frame 55 comprises a horizontally extending cross portion 56 and a pair of arm portions 57 formed individually on the opposite ends of the cross portion 56. The arm portions 57 extend diagonally downward and forward from their corresponding ends of the cross portion 56. A slide member (e.g., slide pin) 58 is provided on an end of each arm portion 57. The slide member 58 is inserted in the guide hole 50 of each slotted bracket 51. It engages the guide hole 50 so that it can move vertically (or in the longitudinal direction of the guide hole) along the hole 50 between its one and other ends 50a and 50b.

The respective lower parts of left- and right-hand support brackets 60 are fixed to the cross portion 56 of the sub-frame 55. Each stay 15 of the head rest 13 is inserted in its corresponding support bracket 60. Each support bracket 60 is tubular and has a grommet 61 on its upper end. Guide brackets 65 are provided on the upper frame member 32. A rear surface 60a of a vertically intermediate portion of each support bracket 60 is pressed against the upper frame member 32 by each corresponding guide bracket 65. Each guide bracket 65 is provided with a plastic slide guide member 66 in a region where it touches its corresponding support bracket 60.

The support brackets 60 can smoothly slide in the vertical direction with respect to the upper frame member 32 with the aid of the slide guide members 66. The rear surface 60a of the vertically intermediate portion of each support bracket 60 is supported by its corresponding guide bracket 65 so that it touches the upper frame member 32 at a point C1 of contact (FIG. 4). Besides, each support bracket 60 is rockably supported by its corresponding guide bracket 65 and the upper frame member 32 so that it can tilt back and forth within a certain angular range θ1 (FIG. 3) around the point C1 of contact with the upper frame member 32.

The slotted brackets 51, sub-frame 55, slide members 58, support brackets 60, guide brackets 65, etc. constitute a head rest tilt mechanism 67, which supports the head rest 13 so that it can tilt back and forth.

In this head rest tilt mechanism 67, the position of the contact points C1 and C2, the length of each arm portion 57 of the sub-frame 55, an angle θ2 (FIG. 3) between each arm portion 57 and its corresponding support bracket 60 are set so that the head rest body 14 and the support bracket 60 move upward as they tilt forward when each slide member 58 is moved diagonally upward and rearward (in the direction indicated by arrow A in FIGS. 3 and 4) along it corresponding guide hole 50.

The head rest tilt mechanism 67 serves to actuate the head rest body 14 when a pressure receiving member 70 moves rearward. More specifically, the head rest tilt mechanism 67 has a function to drive the sub-frame 55 so that the head rest body 14 tilts forward while moving upward as each slide member 58 moves along its corresponding guide hole 50 when the pressure receiving member 70 is moved rearward.

Each slotted bracket 51 has a guide surface 50c that extends along the longitudinal direction of the guide hole 50. The guide surface 50c constitutes a front inner wall of the guide hole 50. Each slide member 58 never fails to touch the guide surface 50c when it moves upward along the guide hole 50.

If a rearward load produced by restraint of an occupant's head acts on the head rest body 14 while the slide member 58 is moving upward along the guide hole 50 or after it is moved, the slide member 58 is pressed against the guide surface 50c to lock the head rest body 14.

In other words, the coefficient of friction between the guide surface 50c and the slide member 58 at the contact point C2, pressure angle at the contact point C2, load vector, etc. are set so that the slide member 58 never slips on the guide surface 50c when the rearward load is applied to it through the head rest body 14.

Each stay 15 of the head rest 13 is inserted into the support bracket 60 through a hole in the grommet 61. It is vertically movable with respect to the support bracket 60. When the head rest body 14 is adjusted to a desired height, the stay 15 is fixed to the support bracket 60 by a locking mechanism (not shown).

A pressure receiving member 70 is provided in the seat back 12 so as to be situated on the lower part of the spring assembly 21, that is, behind the lumbar region of an occupant (seater). The pressure receiving member 70 is attached to the spring assembly 21. If the spring assembly 21 is pushed and bent rearward by the occupant's body, the pressure receiving member 70, along with the spring assembly 21, can move from a front position toward a rear position. A rearwardly projecting press portion 71 is formed on a part of the pressure receiving member 70.

A speed increasing unit 79 is provided in a position opposite the rear surface of the pressure receiving member 70. The speed increasing unit 79 has a base bracket 80 fixed to the lower frame member 33 and first and second arms 81 and 82 attached to the base bracket 80. The speed increasing unit 79 is located on the lower frame member 33 so that the first and second arms 81 and 82 are situated on the upper and lower sides, respectively, and vertically arranged in a tandem or that the longitudinal direction of the base bracket 80 is vertical.

Figure 5:
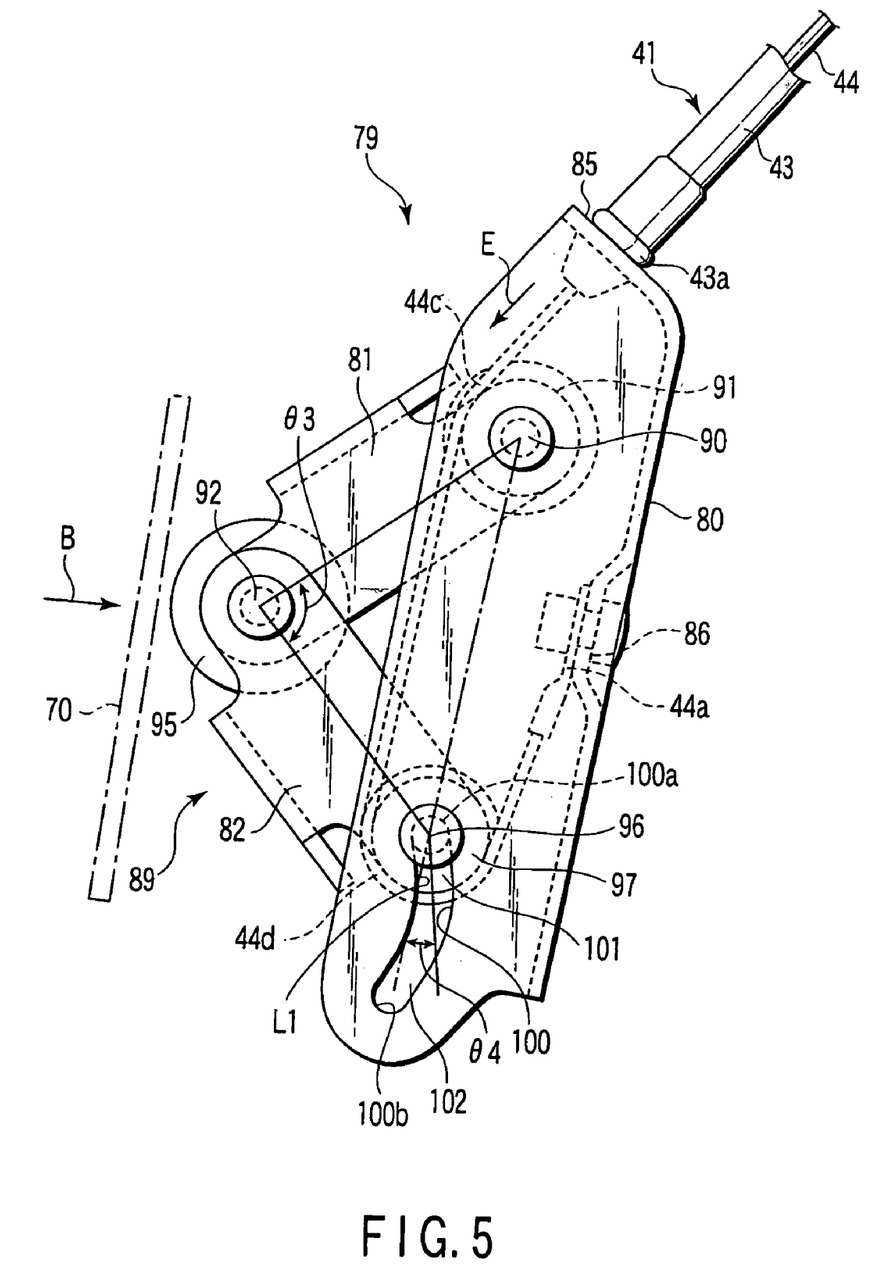
FIG. 5 is a side view of a speed increasing unit of the seat shown in FIG. 2.

As shown in FIGS. 3 and 5, the one end 43a of the outer tube 43 of each of the cables 41 and 42 is connected to a cable supporting portion 85 of the base bracket 80. The one end 44a of the wire 44 of each of the cables 41 and 42 is connected to a wire supporting portion 86 of the base bracket 80.

One end (upper end) of the first arm 81 is rockably supported on the base bracket 80 by a first pin 90. The first pin 90 is an example of a first shaft. The base bracket 80 is provided with a guide pulley 91 that is rockable around the first pin 90.

The first and second arms 81 and 82 are rockably connected to each other by a second pin 92 so that they form a fallen V, as viewed laterally. In other words, the first and second arms 81 and 82 constitute a dog-legged link mechanism 89. They project toward the pressure receiving member 70. Preferably, an angle θ3 between the first and second arms 81 and 82 is 90 degrees or more (obtuse angle). The second pin 92 is an example of a second shaft.

A roller 95 is provided at the junction between the first and second arms 81 and 82. It is an example of an abutting member. The roller 95 is rotatable around the second pin 92. It is located so as to face the press portion 71 that projects from the rear surface of the pressure receiving member 70. When the member 70 moves rearward (direction indicated by arrow B in FIGS. 3 and 5), the press portion 71 abuts against the roller 95.

A third pin 96 and a pulley 97, which is rotatable around the third pin 96, are provided on the other end (lower end) of the second arm 82. The third pin 96 is an example of a third shaft. It is inserted into a guide hole 100 in the base bracket 80 and can move along the hole 100 in its longitudinal direction.

The third pin 96 and the guide hole 100 constitute guide means. The guide means guides the movement of the pulley 97 so that the angle θ3 between the first and second arms 81 and 82 increases when the roller 95 is pushed rearward by the pressure receiving member 70.

When the roller 95 is pushed in the direction of arrow B of FIG. 5 by the pressure receiving member 70, the angle θ3 between the first and second arms 81 and 82 increases. Since the first pin 90 is supported on the base bracket 80, the third pin 96 moves from one end (upper end) 100a to the other end (lower end) 100b of the guide hole 100. Accordingly, the distance from the first pin 90 to the third pin 96 increases gradually. Thus, the pulley 97 moves downward along the guide hole 100.

The guide hole 100 will now be described in detail with reference to FIG. 5.

The guide hole 100 has a first portion 101 situated closer to the first pin 90 and a second portion 102 remoter from the pin 90. The first portion 101 extends diagonally downward and rearward at an angle θ4 to an extension L1 that connects the first and third pins 90 and 96. The second portion 102 is bent on the opposite side (diagonally downward and forward) of the extension L1 with respect to the first portion 101.

Thus, the first portion 101 of the guide hole 100 is inclined at the angle θ4 to the extension L1 that connects the first and third pins 90 and 96. The second portion 102 extends along the extension L1. When the pulley 97 moves along the guide hole 100 from its one end 100a toward the other end 100b, therefore, the third pin 96 can easily move along the first portion 101. The pulley 97 moves faster when the third pin 96 moves along the second portion 102 than when it moves along the first portion 101.

As shown in FIG. 5, a part 44c of the wire 44 of each of the paired cables 41 and 42 is in contact with a part of the guide pulley 91. A part 44d of each wire 44 on the other end side thereof is wound for about a half turn around the pulley 97 that underlies the guide pulley 91. In other words, the one end 44a of each wire 44 is fixed to the wire supporting portion 86 of the base bracket 80 with the part 44d on the other end side U-turned for about 180 degree by the pulley 97.

If the pulley 97 moves along the guide hole 100 from its one end 100a toward the other end 100b, therefore, the pulley 97 moves downward like a running block. Thereupon, each wire 44 is pulled for a length equivalent to twice the distance of movement of the pulley 97. When the pressure receiving member 70 moves rearward (in the direction of arrow B), in other words, the speed corresponding to the motion of the pressure receiving member 70 is increased by the speed increasing unit 79, so that the wire 44 can be pulled quickly.

The other end 44b (FIG. 3) of the wire 44 of each of the cables 41 and 42 is connected to each corresponding slide member 58 of the head rest tilt mechanism 67. If each wire 44 is pulled in the direction indicated by arrow D in FIG. 3 by the speed increasing unit 79, therefore, each slide member 58 of the head rest tilt mechanism 67 moves in the direction indicated by arrow A.

The following is a description of the operation of the vehicle seat 10 constructed in this manner.

When the occupant's body is pressed against the seat back 12 at the time of collision, the pressure receiving member 70 is pushed rearward by a load from the lumbar region of the occupant that acts on the seat back 12. Thereupon, the pressure receiving member 70 pushes the roller 95 of the speed increasing unit 79, so that the second arm 82 moves in a direction such that the angle θ3 (FIG. 4) between the first and second arms 81 and 82 increases.

As this is done, the third pin 96 moves downward along the guide hole 100, so that the pulley 97 moves downward. The wires 44 of the cables 41 and 42 are wound in the shape of a U for about a half turn around the pulley 97. Therefore, they are pulled at a speed about twice as high as the movement speed of the pulley 97 in the direction indicated by arrow E in FIG. 5 by the so-called principle of a running block. Thereupon, the slide members 58 of the head rest tilt mechanism 67 move in the direction indicated by arrow A in FIG. 3.

The first portion 101 of the guide hole 100 is inclined rearward at the angle θ4 to the extension L1 that connects the first and third pins 90 and 96. When the roller 95 is pushed in the direction of arrow B, therefore, the third pin 96 initially moves a little rearward along the first portion 101 as it moves downward. Thus, the wires 44 can be easily drawn out of the outer tubes 43.

Since the third pin 96 moves along the second portion 102, thereafter, the wires 44 are drawn out at a higher speed. The guide hole 100 can adjust the speed at which the wires 44 are drawn out by changing the tilt angle θ4 of the first portion 101 or changing an angle of the second portion 102 to the first portion 101.

As the wires 44 of the cables 41 and 42 are simultaneously pulled by the speed increasing unit 79, the slide members 58 of the head rest tilt mechanism 67 move diagonally upward and rearward (in the direction indicated by arrow A in FIGS. 3 and 4) along their corresponding guide holes 50.

As the arm portions 57 of the sub-frame 55 then move upward and rearward, the support brackets 60 move so as to fall down forward around the contact point C1 while ascending. Since the contact point C1 itself remains in one and the same position without moving forward, the head rest body 14 moves forward and upward in the path indicated by arrow M1 in FIG. 4 without hastening the restraint of the occupant's under-neck region. As this is done, the occupant's head can be quickly restrained by the head rest body 14 before the under-neck region is restrained.

In the present embodiment, the slotted brackets 51 are provided on or near the left- and right-hand side frame members 30 and 31. Therefore, a space for the evacuation of the occupant's body at the time of collision can be secured, so that the restraint of the under-neck region cannot be hastened. Besides, the restraint of the under-neck region is never expedited also because the sub-frame 55 is located behind the seat back 12 and moves further rearward (and upward) when the head rest 13 is actuated. Thus, the head rest 13 enjoys a high operating efficiency and never hastens the restraint of the under-neck region. Accordingly, the seat back 12 can effectively reduce the whiplash injury value.

If the occupant's head touches the head rest body 14, thereby applying a horizontal rearward load on the head rest body, after or during the action of the head rest 13, moreover, the load is received at the two contact points C1 and C2, upper and lower (FIG. 4). Thus, return of head rest body 14 can be checked, so that the occupant's head can be restrained to lower the whiplash injury value effectively.

In the seat back 12 of the present embodiment, a rearward movement of the pressure receiving member 70 is transmitted from the speed increasing unit 79 to the head rest tilt mechanism 67 through the respective wires 44 of the cables 41 and 42. Even if the distance from the speed increasing unit 79 to the tilt mechanism 67 is long, therefore, the movement of the pressure receiving member 70 can be quickly transmitted to the tilt mechanism 67 by the wires 44.

Thus, if the distance from the speed increasing unit 79 to the head rest tilt mechanism 67 is relatively long, the entire apparatus, including the pressure receiving member 70 and the tilt mechanism 67, can be made light in weight. Further, the speed increasing unit 79 and the tilt mechanism 67 can be easily laid out in the seat back 12.

In the vehicle seat 10 of the present embodiment, moreover, the speed corresponding to the motion of the pressure receiving member 70 at the time of collision is increased by the speed increasing unit 79, and the head rest tilt mechanism 67 is actuated by the wires 44. Thus, the response is high, and the operation suffers no delay. Since the speed increasing unit 79 is constructed independently of the pressure receiving member 70, it can be efficiently attached to the seat back frame 20.

Figure 6:
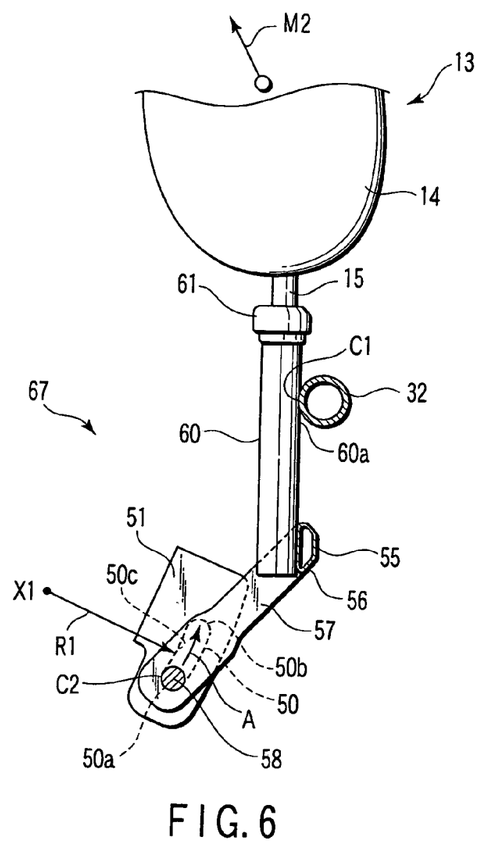
FIG. 6 is a side view of a head rest tilt mechanism according to a second embodiment of the invention.

FIG. 6 shows a second embodiment of the invention. A guide hole 50 of this embodiment is in the shape of a circular arc, of which a center (center of curvature) X1 is situated in front of the guide hole 50. When a slide member 58 moves in the direction indicated by arrow A along the guide hole 50, a support bracket 60 moves so as to fall down forward around a contact point C1 while ascending. The slide member 58 touches a guide surface 50c of the guide hole 50 at a contact point C2. By suitably setting an arcuate shape and a curvature radius R1 of the guide hole 50, in this case, a sub-frame 55 can be moved so that a head rest body 14 describes the path indicated by arrow M2.

Figure 7:
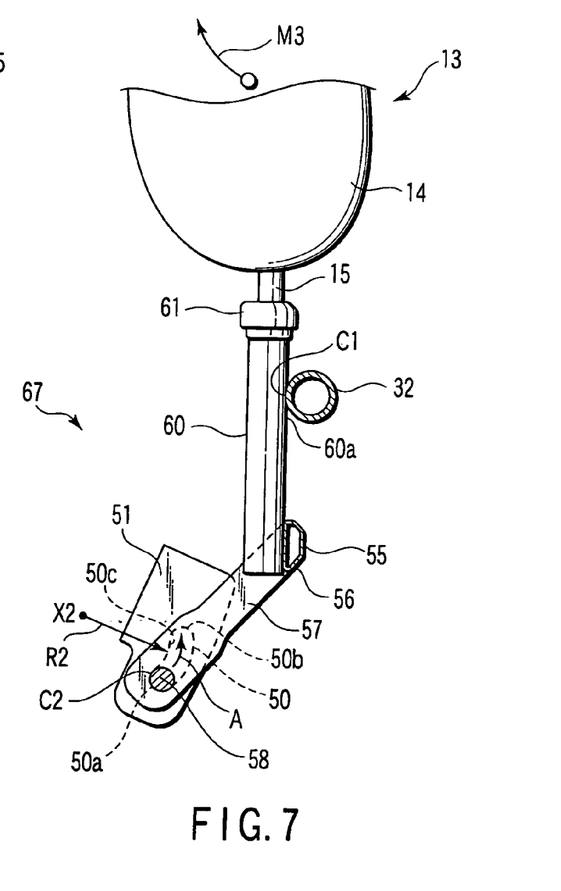
FIG. 7 is a side view of a head rest tilt mechanism according to a third embodiment of the invention.

FIG. 7 shows a third embodiment of the invention. A guide hole 50 of this embodiment is also in the shape of a circular arc, of which a curvature radius R2 is smaller than the curvature radius R1 of the guide hole 50 of the second embodiment (FIG. 6). When a slide member 58 moves in the direction indicated by arrow A, also in this case, a support bracket 60 moves so as to fall down forward around a contact point C1 while ascending. The slide member 58 touches a guide surface 50c at a contact point C2. Depending on the curvature radius R2 of the guide hole 50, therefore, a sub-frame 55 can be moved so that a head rest body 14 describes the path indicated by arrow M2.

Figure 8:
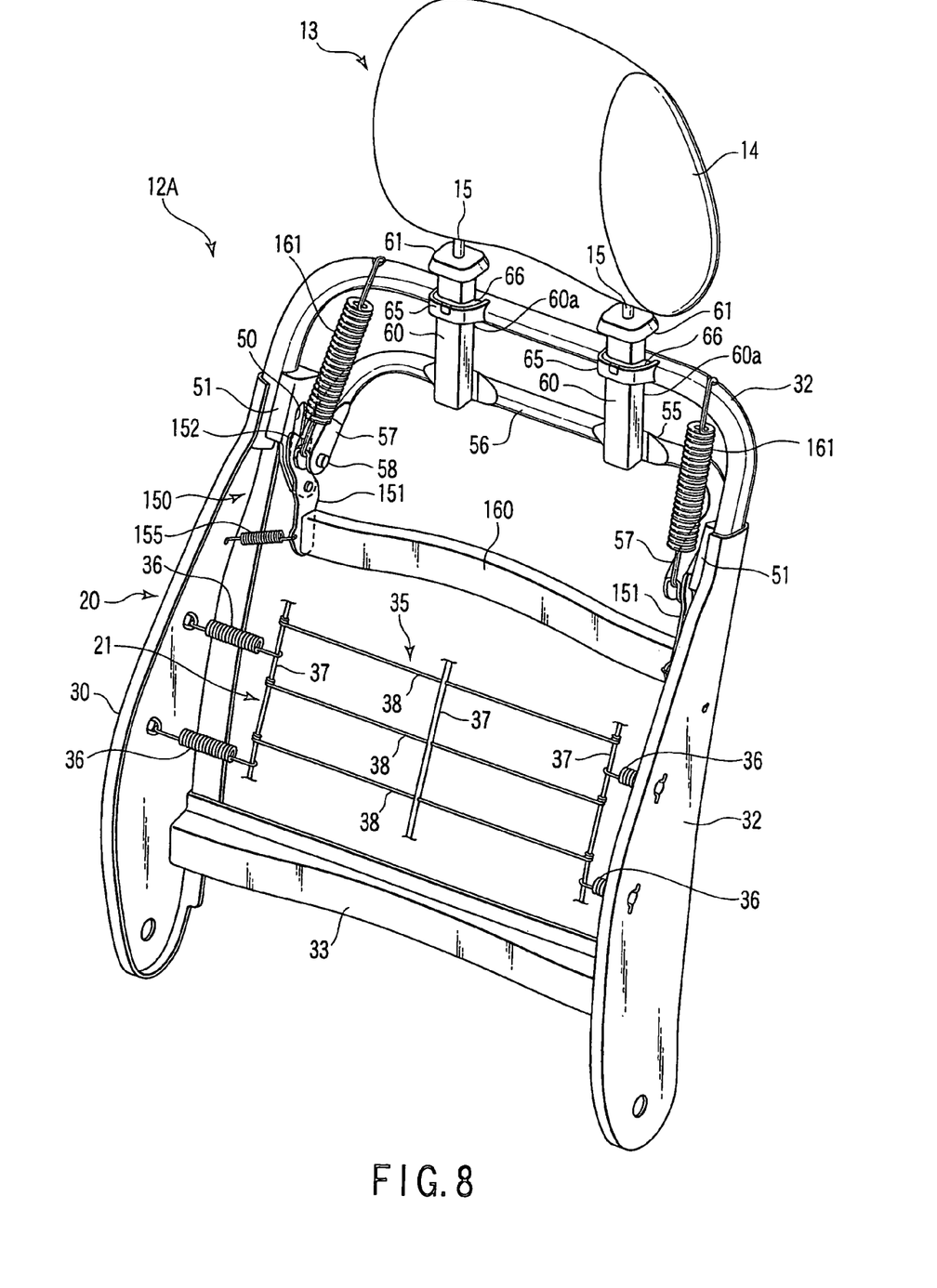
FIG. 8 is a perspective view showing the interior of a seat back according to a fourth embodiment of the invention.
Figure 9A:
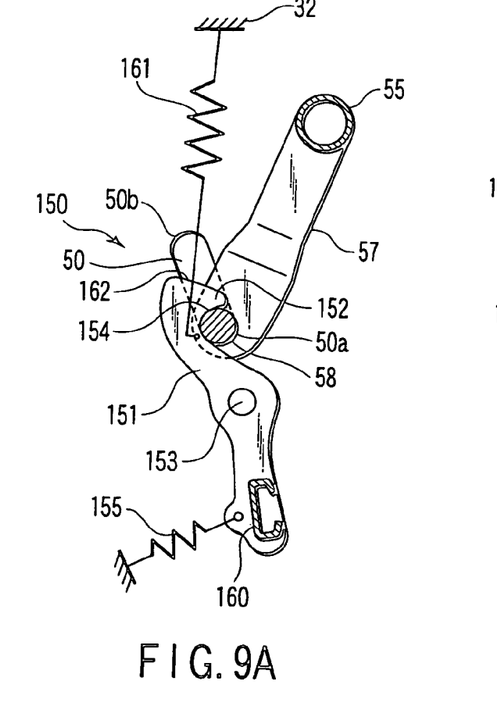
FIG. 9A is a side view showing a state in which a retaining member of a head rest tilt mechanism of the seat back shown in FIG. 8 is in engagement with a receiving portion.
Figure 9B:
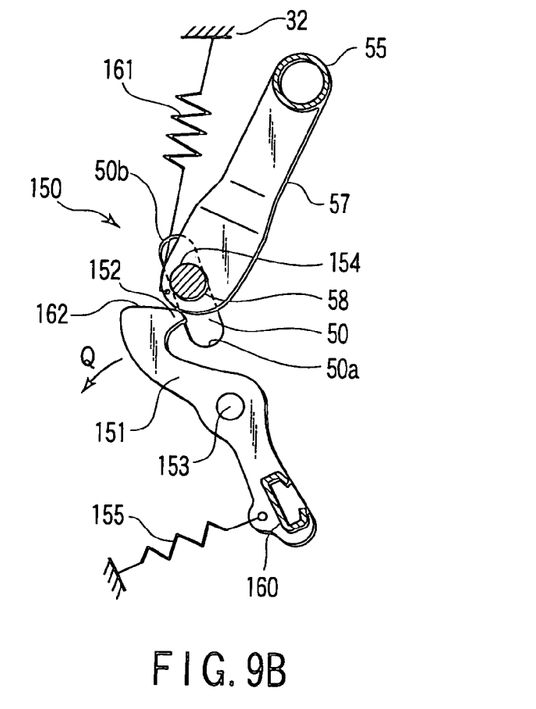
FIG. 9B is a side view showing a state in which the retaining member of the head rest tilt mechanism of the seat back shown in FIG. 8 is disengaged from the receiving portion.

FIGS. 8, 9A and 9B show a seat back 12A that is provided with a head rest tilt mechanism 150 according to a fourth embodiment of the invention. Common numerals are used to designate common portions of the seat back 12A and the seat back 12 of the first embodiment, and a description of those portions is omitted. The following is a description of different portions.

The head rest tilt mechanism 150 of the seat back 12A comprises retaining members 151 that are attached individually to left- and right-hand slotted brackets 51. As shown in FIGS. 9A and 9B, a hook portion 152 is formed on the upper part of each retaining member 151.

Each retaining member 151 can rock back and forth around a shaft 153. As shown in FIG. 9A, the retaining member 151 can frontally engage and be disengaged from a receiving portion 154 on a slide member 58. The hook portion 152 may be configured to be anchored to the lower end portion of an arm portion 57 of a sub-frame 55 instead of being anchored to the slide member 58. The retaining member 151 is urged by a spring 155 in a direction such that its engagement with the receiving portion 154 is maintained.

The respective lower end portions of the left- and right-hand retaining members 151 are connected to each other by a pressure receiving member 160. The pressure receiving member 160 is provided in the seat back 12A so as to be situated behind the occupant's back. When the occupant's body is pressed against the pressure receiving member 160 at the time of collision, the pressure receiving member 160 moves rearward. Thereupon, the retaining member 151 rocks in an unlocking direction (indicated by arrow Q), so that the hook portion 152 is disengaged from the receiving portion 154, as shown in FIG. 9B.

The seat back 12A comprises a tension spring 161 that urges the slide member 58 to be pulled up. The upper end of the tension spring 161 is anchored to an upper frame member 32, and the other end to the arm portion 57 of the sub-frame 55.

The following is a description of the operation of the seat back 12A.

When the occupant's body is pressed against the seat back 12A at the time of collision, the pressure receiving member 160 is moved rearward by a load from the lumbar region of the occupant that acts on the seat back 12A. Thereupon, the hook portion 152 is disengaged from the receiving portion 154, as shown in FIG. 9B, so that the slide member 58 is moved upward along a guide hole 50 by the elasticity of the tension spring 161, and a head rest body 14 moves upward as it tilts forward.

When the pressure receiving member 160 is moved rearward, according to the seat back 12A of this embodiment, the hook portion 152 is disengaged from the receiving portion 154, so that the head rest body 14 can be actuated by the tension spring 161. Thus, line members, such as the cables 41 and 42 for load transmission according to the first embodiment, are unnecessary.

If the actuated head rest body 14 is manually returned to its original position (position before the actuation), the slide member 58 abuts against an upper slope 162 of the retaining member 151 while it is moving toward one end 50a of the guide hole 50. After the retaining member 151 is rocked in the direction of arrow Q of FIG. 9B, it returns to the locked position shown in FIG. 9A.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle seat which includes a seat back having a seat back frame having an upper frame member extending in a horizontal direction and a head rest having a head rest body provided on the top of the seat back and a stay extending under the head rest body, comprising:

a support bracket in which the stay of the head rest is inserted;

a guide bracket which is provided on the seat back frame and supports a rear surface of a vertically intermediate portion of the support bracket on a front surface of the upper frame member of the seat back frame so that the support bracket is vertically movable;

a pressure receiving member which is provided in the seat back and moves rearward when pushed by the body of an occupant;

a sub-frame having a cross portion to which a lower part of the support bracket is fixed and a pair of arm portions which extend individually downward from the opposite ends of the cross portion;

a head rest tilt mechanism which actuates the head rest body when the pressure receiving member is moved rearward, the head rest tilt mechanism including slotted brackets, each of which has a guide hole extending toward the upper frame member from a lower portion thereof and is provided on the seat back frame, and slide members, which individually movably engage the respective guide holes of the slotted brackets and are provided individually on the arm portions of the sub-frame, and being configured to drive the sub-frame so that the head rest body tilts forward while moving upward as the slide members are moved along the guide holes when the pressure receiving member is moved rearward; and a cable mechanism for transmitting the movement of the pressure receiving member to the slide members when the pressure receiving member is moved rearward, wherein each of said slotted brackets has a guide surface with which a corresponding one of said slide members is brought into contact as the slide member moves toward the upper frame member along the guide hole, the guide surface being a surface against which the slide member is pressed to lock the head rest body when a rearward load produced by restraint of the head of the occupant acts on the head rest body.

2. A vehicle seat according to claim 1, wherein each said guide hole is a straight slot formed corresponding to a path of action of the head rest body.

3. A vehicle seat according to claim 1, wherein each said guide hole is an arcuate slot formed corresponding to a path of action of the head rest body.

4. A vehicle seat according to claim 3, wherein each said slotted bracket has a guide surface with which each said corresponding slide member is brought into contact as the slide member moves along the guide hole, the guide surface being a surface against which the slide member is pressed to lock the head rest body when a rearward load produced by restraint of the head of the occupant acts on the head rest body.

* * * * *